Aug. 22, 1939.  E. T. PARSONS  2,170,424
LOAF MOLDER AND EXTENDER
Filed Jan. 28, 1938  4 Sheets-Sheet 1
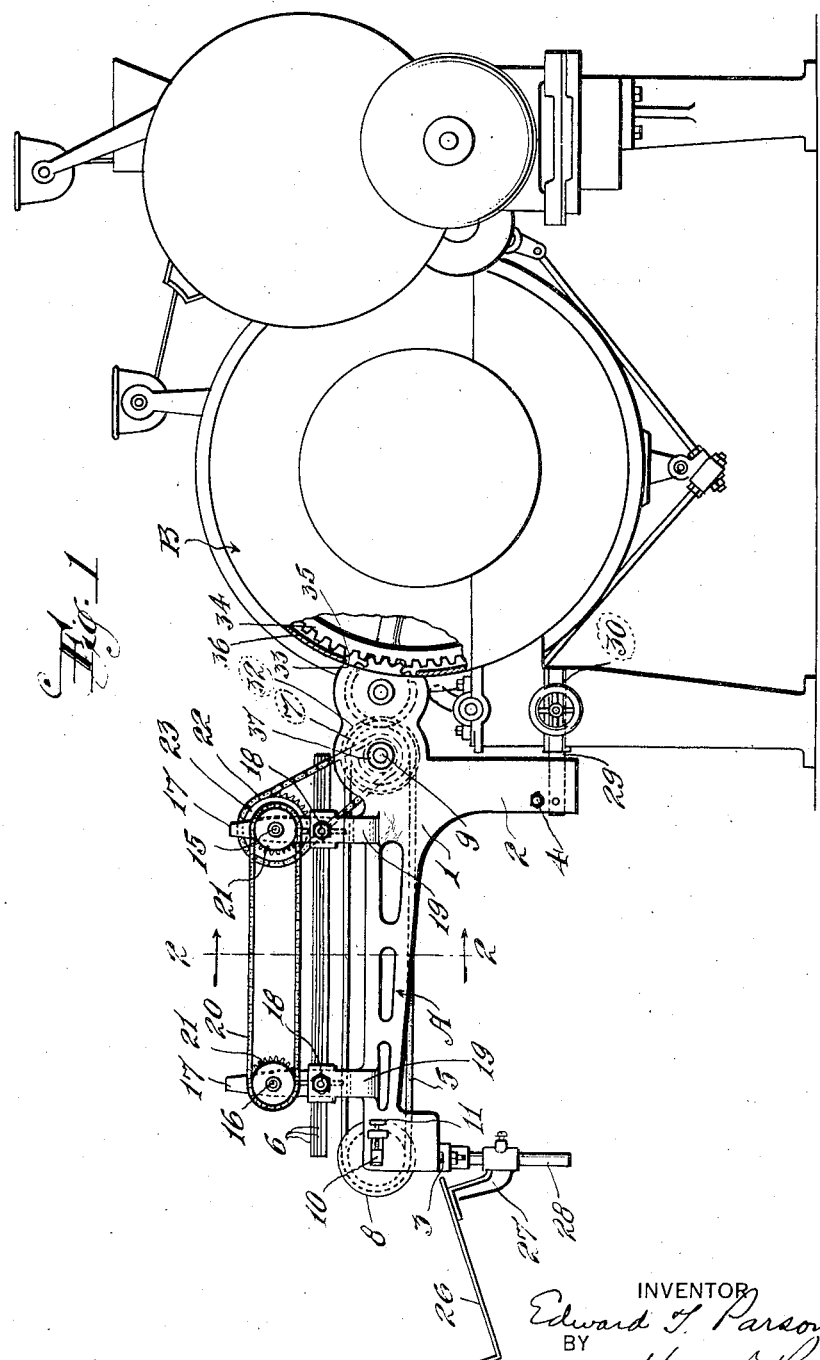
INVENTOR
Edward T. Parsons
BY
Harry B. Rook.
ATTORNEY

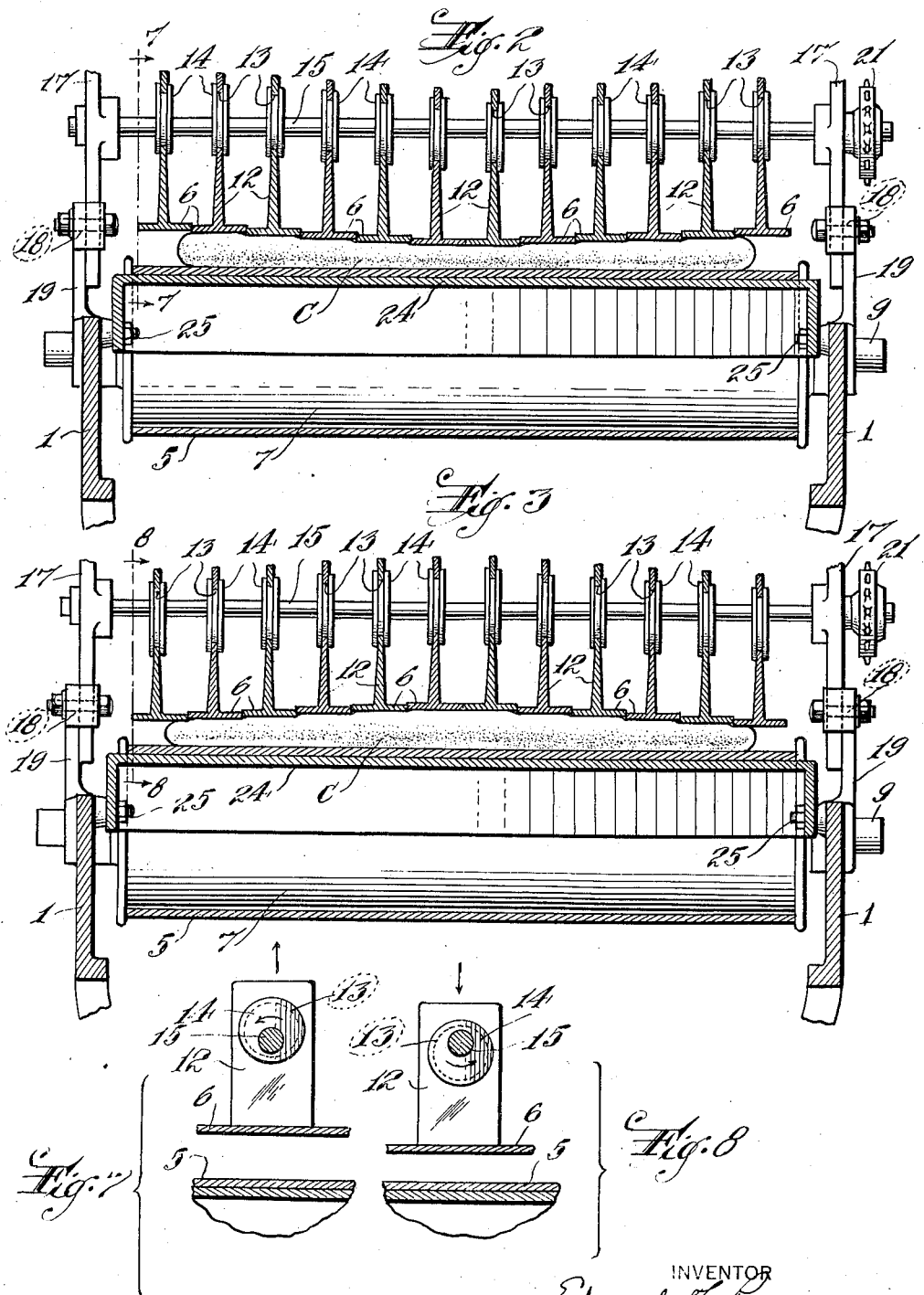

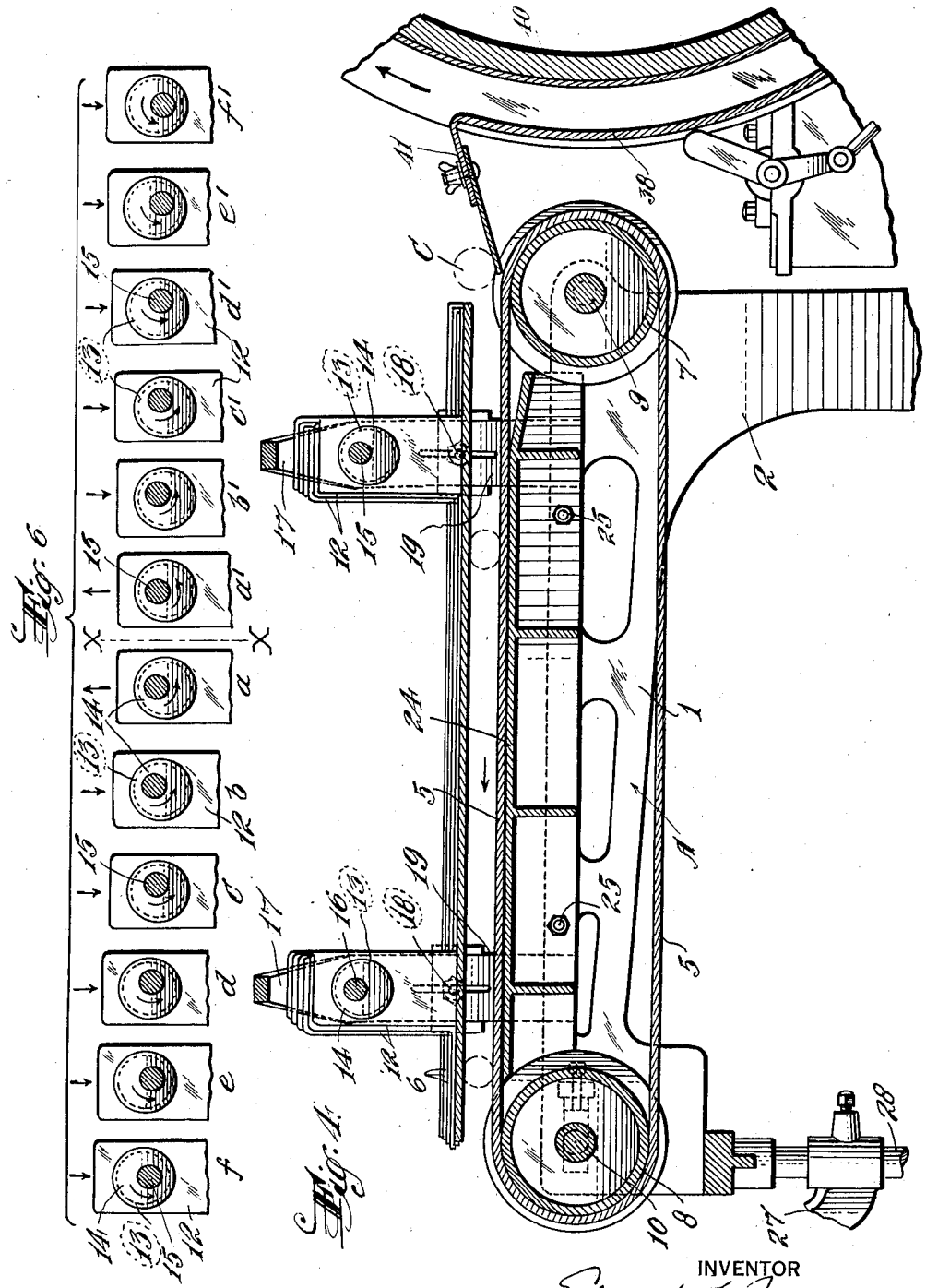

Aug. 22, 1939.    E. T. PARSONS    2,170,424
LOAF MOLDER AND EXTENDER
Filed Jan. 28, 1938    4 Sheets-Sheet 4
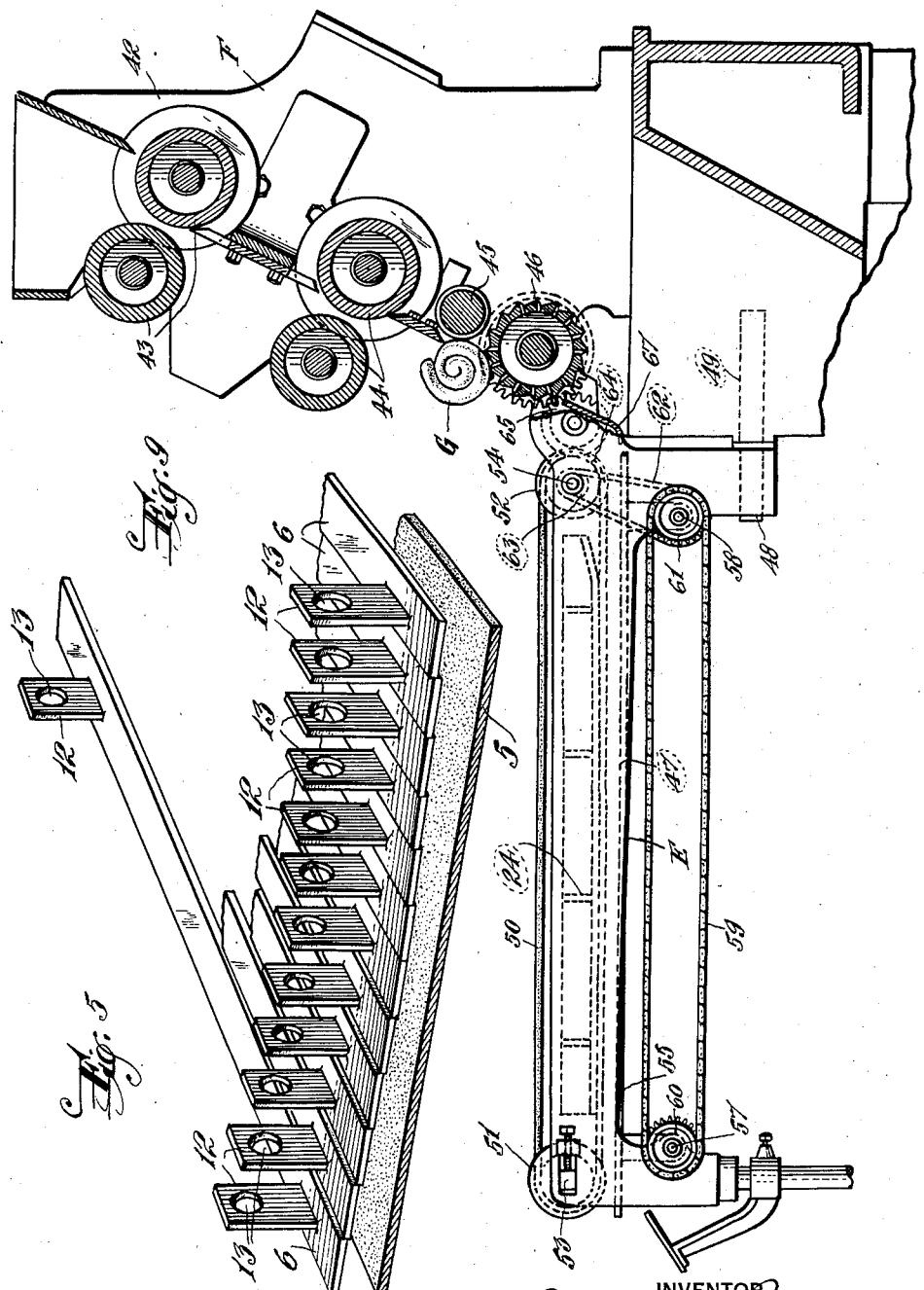
INVENTOR
Edward T. Parsons,
BY
Harry B. Rook.
ATTORNEY Patented Aug. 22, 1939

2,170,424

UNITED STATES PATENT OFFICE 2,170,424

LOAF MOLDER AND EXTENDER

Edward T. Parsons, Upper Montclair, N. J., assignor to Thomson Machine Company, Belleville, N. J., a corporation of New Jersey Application January 28, 1938, Serial No. 187,350

9 Claims. (Cl. 107—9)

This invention relates in general to a machine for molding and extending, elongating or stretching a roll of dough. In molding of dough into rolls for forming loaves, it is highly desirable, if not necessary, to work the dough without breaking the gas cells in the dough or forcing the gas from the dough, and to mold and elongate the roll of dough without rupturing or tearing the "skin" of the roll.

Other results much sought after in the dough working industry, are the uniform distribution of gas cells throughout the loaf of dough, and the elimination of excessively large gas cells which cause the formation of large voids in the baked loaf.

Many machines have been produced in efforts to achieve these results, but, while some of the known machines have operated more or less satisfactorily, they do not fully accomplish the results desired.

A prime object of my invention is to provide a novel and improved machine by which a roll of dough may be molded and elongated with a minimum of breaking of gas cells, with a minimum loss of gas from the roll, with a uniform distribution of small gas cells throughout the roll and without tearing or rupturing of the "skin" of the roll.

I have discovered that these results can be achieved by a novel and improved method of working the dough, that is, by rolling the dough continuously between two molding elements and at the same time alternately exerting and relieving pressure on the roll intermittently at different zones extending longitudinally of the roll. More specifically, while the dough is being rolled, pressure is repeatedly alternately applied thereto and relieved at each of a plurality of zones extending longitudinally of the roll between the longitudinal center and the ends of the roll. Preferably the pressure is applied at said zones in succession back and forth between the longitudinal center and the ends of the roll, so that the dough displaced by pressure at one zone freely moves to an adjacent zone as the pressure is relieved at the latter zone, whereby the tendency to concentration of the gas cells or to rupture of the gas cells so as to permit escape of gas or form excessively large cells, and the tendency to tear the "skin" as it is stretched, are reduced to the minimum. The gentle but firm pressure thereby applied to the roll of dough, causes the roll to be gradually reduced in diameter and simultaneously elongated.

Another object is to provide novel and improved means whereby the roll of dough can be molded and elongated as described, and which shall be simple and reliable in construction and operation.

A further object is to provide a novel and improved device of the general character described which shall include two opposed dough working elements to receive a roll of dough between them, one of which shall cause the dough to roll between said elements and the other of which shall alternately apply and relieve pressure on the roll at a plurality of zones spaced longitudinally of the roll, whereby the dough shall be progressively pushed successively from zone to zone longitudinally of the roll to elongate the roll and simultaneously reduce its diameter.

Another object is to provide such a machine that can be used either in conjunction with a known loaf molder for extending the loaf formed in the molder, or itself can be utilized as a loaf molder in association with a known dough sheeting and curling mechanism which sheets a lump of dough and spirally curls it into a roll.

Other objects, advantages and results of the invention will appear from the following description when read in conjunction with the accompanying drawings in which Figure 1 is a side elevational view of a loaf extender embodying my invention, showing the same attached to a modern type of loaf molder, portions of the loaf molder being broken away to show the driving connection between the molder and the extender.

Figure 2 is an enlarged transverse vertical sectional view on the line 2—2 of Figure 1, showing the extender slats in one position.

Figure 3 is a similar view showing the extender slats in another position.

Figure 4 is an enlarged vertical longitudinal sectional view through the extender.

Figure 5 is a fragmentary perspective view of portions of the extender slats and the conveyor belt.

Figure 6 is a composite schematic view showing the relations of the eccentrics for operating the extender slats.

Figures 7 and 8 are fragmentary vertical longitudinal sectional views on the lines 7—7 and 8—8 of Figures 2 and 3 respectively, and Figure 9 is a side elevational view of a modified form of extender showing it applied to a dough sheeting and curling mechanism, which is shown in vertical longitudinal section.

In Figures 1 to 8 inclusive, I have shown one form of extender A in conjunction with a modern type of loaf molder B, while in Figure 9 I have shown another form of extender associated with a known type of dough sheeting and curling mechanism. It should be understood that these illustrations are primarily for the purpose of explaining the principles of the invention and that the extender may be used separate from a loaf molder or a sheeting mechanism and the details of structure of the extender may be modified and changed without departing from the spirit or scope of the invention.

Referring particularly to Figures 1 to 6 inclusive, the extender comprises a frame formed of a pair of spaced and parallel side pieces 1 formed at one end thereof with depending arms 2, said side pieces being connected at their ends by a transverse bar 3 and a bolt 4. This structure is in general similar to that shown in my Patent No. 1,548,378 dated August 5, 1925.

On the frame A are mounted the two dough working elements, one of which comprises a conveyor belt 5 preferably formed of canvas, while the other element includes a plurality of slats or bars 6 arranged in opposed relation to the upper reach of the belt 5.

The belt 5 is shown as mounted on rollers 7 and 8 mounted on the respective shafts 9 and 10 that are journaled horizontally on the ends of the side pieces 1. The shaft 10 is preferably adjustable longitudinally of the frame by suitable means such as a set screw 11 for adjusting the tension of the belt 5.

The extender slats or bars 6 are shown as extending longitudinally of the upper reach of the belt, the slats being arranged side by side transversely of the belt with their longitudinal edges in abutting relation, as clearly shown in Figures 2 and 3. Means is provided for bodily moving the slats toward and from the conveyor belt, and as shown, this means includes two straps 12 for each slat, each strap being rigidly connected adjacent one end of the slat and having an opening 13 in which is disposed an eccentric or cam 14. The eccentrics 14 are mounted on the shafts 15 and 16 disposed respectively above the ends of the slats; and as shown, the shafts 15 and 16 are journaled in inverted U-shaped yokes 17 which are adjustably mounted by bolt and slot connections 18 on standards 19 secured to the side pieces 1 of the frame.

At each side of the longitudinal median plane of the extender the eccentrics are arranged in different radially angular relations to their respective shafts, but each eccentric at one side of said longitudinal median plane is disposed at the same radially angular relation to its shaft as the corresponding eccentric at the other side of said longitudinal median plane; and the eccentrics on the two shafts 14 and 15 for each slat are disposed in the same radially angular relation to their respective shafts. The distance between the openings 13 in the straps 12 and the slats are the same, so that in any one position of the slats the slats at one side of the longitudinal median plane of the extender are spaced different distances from the reach of the conveyor belt 5, and any slat at one side of the longitudinal median plane of the extender is disposed the same distance from the conveyor belt as the corresponding slat at the other side of the longitudinal median plane. The slats may be arranged to change the shape of the space between the slats and the reach of the belt, as desired. One preferred arrangement is illustrated.

In one position of the slats as shown in Figure 2, the slats at each side of the longitudinal median plane are successively greater distances from the conveyor belt outwardly from said longitudinal median plane; while in another position of the slats as shown in Figure 3 the slats at each side of the longitudinal median plane of the extender are disposed successively smaller distances from the conveyor belt outwardly from said plane.

In operation of the extender, the belt 5 is driven in the direction indicated by the arrows, and the slats 6 are adjusted by the bolt and slot connections 18 into a position at a distance from the upper reach of the bolt less than the diameter of the roll of dough which previously has been formed for example in the molder B. The roll of dough indicated by dot and dash lines on Figure 4 is deposited in the space between the upper reach of the belt and the slats 6 as indicated at C in Figure 4, whereupon the belt will draw the roll into said space and roll the same longitudinally of the belt and the slats 6.

Simultaneously the slats 6 will be reciprocated toward and from the upper reach of the conveyor belt so as to repeatedly alternately apply pressure to and relieve pressure from the roll at each of the plurality of zones beneath the slats extending longitudinally of the roll between the longitudinal center and the ends of the roll. To this end the shafts 14 and 15 will be simultaneously rotated as by a chain 20 connecting sprockets 21 on the shafts, and a chain 22 connected to a sprocket 23 on one of the shafts and also connected to a suitable source of power for example, the driving mechanism of the molder B.

As shown, the pressure will be applied to the roll of dough at said zones in succession back and forth between the center and the ends of the roll as shown in Figures 2 and 3 and schematically in Figures 6, 7 and 8.

It will also be observed that the slats have endwise or longitudinal reciprocating motion so that the slats will exert a rolling action on the dough simultaneously with the pressure exerted as the result of the reciprocation of the slats toward and from the conveyor belt. These operations are schematically illustrated in Figure 6 where one shaft and the corresponding eccentrics and straps for all of the slats are shown. The longitudinal median plane of the extender is indicated by the line X—X, and the straps for the slats that are disposed at opposite sides of said longitudinal median plane are designated a, b, c, d, e and f, and a', b', c', d', e', and f', respectively. The eccentrics for the innermost slats a and a' are in the position to locate said slats closest to the conveyor belt, while the eccentrics for the outermost slats f and f' are in the position corresponding to the greatest distance of said slats from the conveyor belt, these positions corresponding to the positions of the slats illustrated in Figure 2. As the eccentrics rotate, the direction of movement of the straps and slats will be reversed to bring the slats into the position shown in Figure 3.

In continued operation of the extender, the space between the conveyor belt and the slats 6 being less than the diameter of the roll C, when the roll enters said space it is compressed into an oval cross section, and gradually is lengthened, rounded and reduced in diameter as it passes toward the discharge end of the extender at the left hand side of Figures 1 and 4. During this operation it will be observed that the dough displaced by pressure of a slat at one zone freely moves to an adjacent zone as the pressure is relieved there by the corresponding slat. Accordingly, excessive pressure on the roll of dough which might cause concentration of the gas cells or rupture of the gas cells so as to permit escape of gas or form excessively large cells, is prevented, and the tendency to tearing of the "skin" of the roll as it is stretched is reduced to the minimum.

To reenforce the upper reach of the belt against flexing as the roll passes between it and the slats 6, a backing plate 24 is arranged at the side of the upper reach of the belt opposite the slats, the said backing plate being mounted in any suitable manner as by bolts 25 on the side pieces 1 of the frame.

The extent of elongation of the roll of dough obviously will be determined by the pressure exerted thereon, which is in turn determined by the distance of the slats 6 from the upper reach of the belt. This distance may be adjusted as desired to compensate for rolls of different diameter and for more or less elongation of the rolls, by adjustment of the yokes 17 carrying the shafts 16 in the standards 19. The elongated roll is discharged from the machine upon a plate or pan 26 adjustably mounted by means of a bracket 27 on a vertical post 28 secured to the transverse strip 3 from which pan the roll may be placed in a baking pan or otherwise disposed of.

For connecting the extender to the molder B the arms 2 of the side pieces 1 are each formed with a laterally projecting rod 29 which is adapted to removably fit a corresponding opening 30 formed in the frame of the molder at the discharge end thereof. The frame of the molder has threaded therein a clamping screw 31 for engaging one of the rods 29 to securely hold the same in position.

As above indicated the belt 5 preferably is driven from the loaf molder, and for this purpose I provide the roller shaft 9 with a gear 32 which meshes with an idler 33 journaled in an extension of one of the side pieces of the frame A, which idler is adapted to mesh with the driving gear 34 of the loaf molder drum 40 through an opening 35 in the gear guard 36. The shaft 7 also carries a sprocket 37 which is connected to the chain 22 for driving the shafts 21 that actuate the slats 6.

The drum 40 of the loaf molder is of the modern construction and is adapted to form and knead with the pressure plate 38 a loaf of a certain size, and in operation of the combination of the extender and the loaf molder, the loaf is rolled upwardly on the pressure plate 38 by rotation of the drum 40 until it reaches the upper end of the pressure plate whereupon it rolls by gravity downwardly over an extension 41 on the pressure plate into the space between the upper reach of the belt 5 and the extender slats 6.

The upper reach of the belt 5 and the slats 6 are shown as arranged substantially parallel to each other, but under some circumstances it may be desirable to arrange the belt and slats at an inclination to each other so as to position the discharge end of the slats closer to the belt than the feeding end thereof.

In Figure 9 of the drawings the extender is shown in conjunction with a dough sheeting and curling mechanism F of known construction, for example as shown in Patent No. 1,542,832 dated June 23, 1925. The sheeting and curling mechanism includes a frame 42 on which are mounted two pairs 43 and 44 of rollers for forming a lump of dough into a sheet. Beneath the lowermost set 44 of sheeting rollers are rolls 45 and 46 of known construction for spirally curling a sheet of dough into an approximately cylindrical roll G.

The extender E is of a somewhat different construction than the extender A, but includes a frame comprising side pieces 47 approximately the same as the side pieces 1 and having rods 48 to be separably fitted into openings 49 in the frame F of the dough sheeting and curling mechanism for mounting the extender on the mechanism F. A conveyor belt 50, like the belt 5, is mounted on rollers 51 and 52 that are carried by shafts 53 and 54 that are journaled in the side pieces 47. Beneath the lower reach of the belt 5 are disposed the extender slats 55 which are identical in construction with the slats 6 and are operated by eccentrics (not shown) corresponding to the eccentrics 14 which are mounted on the shafts 57 and 58 journaled in the side pieces 47. The two shafts 57 and 58 are driven simultaneously by a chain 59 and sprockets 60 and 61.

For driving the shaft 58, that shaft carries a second sprocket (not shown) which is connected by a chain 62 to a sprocket 63 on the roller shaft 54. This roller shaft 54 also carries a pinion 64 corresponding to the pinion 32, which meshes with an idler 65 journaled in an extension of one of the side pieces 47 and meshing with a gear 66 on the shaft of the curling roller 46. The curling roller 46 is driven by known means through a train of gearing, from, for example an electric motor.

For conducting the roll of dough G from the curling roller to the space between the slats 55 and the lower reach of the belt 50 I may provide a bridge plate 67.

The operation of this form of extender is substantially the same as that of the form shown in Figures 1 to 8 inclusive, and it will be observed that the main difference between the two extenders is that in the form shown in Figure 9 the extender slats are disposed beneath the conveyor belt and support the roll of dough, whereas in the form shown in Figures 1 to 8 inclusive the slats are above the conveyor and the conveyor supports the roll of dough. Furthermore, in the form shown in Figures 1 to 8 inclusive the extender serves to extend a previously formed and kneaded loaf of dough, whereas in the form shown in Figure 9, the extender serves as a molder for forming and kneading the roll G into a loaf.

If desired, the slats 55 may be arranged at an inclination to the opposed reach of the belt 50 so that the discharge ends of the slats are closer to the belt than the dough receiving ends.

Having thus described my invention, what I claim is:

1. A machine of the character described comprising opposed dough working elements to receive a piece of dough between them, and means for operating said elements to roll said piece of dough between said elements and simultaneously continuously reciprocate one of said elements toward and from the other to alternately apply and relieve pressure to and from said piece of dough to form the latter into an elongated roll.

2. A machine of the character described comprising opposed dough working elements to receive a piece of dough between them, one of which is a conveyor belt while the other includes a plurality of slats in spaced opposed relation to one reach of the belt and reciprocable toward and from said reach, and means for operating said elements to cause said reach of the belt to move longitudinally of the slats and said slats to move alternately toward and from said reach for alternately applying and relieving pressure to and from said piece of dough and form the latter into a roll.

3. A machine of the character described comprising a conveyor belt, means for driving said belt, a plurality of slats in spaced opposed relation to one reach of the belt with their longitudinal edges extending longitudinally of said reach and in abutting relation to each other, and means for reciprocating said slats individually toward and from said reach of the belt to apply and relieve pressure alternatively to and from the piece of dough at each of a plurality of zones.

4. A machine of the character described comprising a conveyor belt, means for driving said belt, a plurality of slats in spaced opposed relation to one reach of the belt with their longitudinal edges extending longitudinally of said reach and in abutting relation to each other, and means for reciprocating said slats in succession toward and from the belt between the longitudinal median plane and the side edges of said reach of the belt to apply and relieve pressure alternately to and from the piece of dough at each of a plurality of zones.

5. A machine of the character described comprising a conveyor belt, means for driving said belt, a plurality of slats in spaced opposed relation to one reach of the belt with their longitudinal edges extending longitudinally of said reach and in abutting relation to each other, and means for individually reciprocating said slats toward and from said reach of the belt and at the same time reciprocating said slats individually longitudinally to apply and relieve rolling pressure alternately to and from the piece of dough at each of a plurality of zones corresponding to the slats.

6. A machine of the character described comprising a conveyor belt, means for driving said belt, a plurality of slats in spaced opposed relation to one reach of the belt with their longitudinal edges extending longitudinally of said reach and in abutting relation to each other, a pair of shafts mounted transversely of said slats one adjacent each end of the slats, an eccentric on each shaft for each slat, operative connections between said eccentrics and the respective slats, and means for simultaneously rotating said shafts, to reciprocate said slats individually toward and from said reach of the belt and at the same time longitudinally reciprocate the slats individually to apply and relieve rolling pressure alternately to and from the piece of dough at each of a plurality of zones corresponding to the slats.

7. A machine of the character described comprising opposed dough working elements to receive a piece of dough between them, one of which includes a plurality of slats in spaced opposed relation to the other element with their longitudinal edges extending longitudinally of said other element and in abutting relation to each other, means for moving said other element longitudinally of said slats, and means for reciprocating said slats individually toward and from said other element to apply and relieve pressure alternately to and from the piece of dough at each of a plurality of zones corresponding to said slats.

8. A machine of the character described comprising opposed dough working elements to receive an approximately cylindrical piece of dough between them, one of which includes a plurality of relatively movable parts, means for operating one of said elements to roll said piece between said elements, and means for moving said parts of the first mentioned element toward and from the other element to alternately apply and relieve pressure to and from said piece of dough successively at a plurality of zones between the longitudinal center and the ends of the piece.

9. A machine of the character described comprising opposed dough working elements to receive a piece of dough between them, one of which has an approximately flat surface while the other includes a plurality of slats in spaced opposed relation to said flat surface and reciprocable toward and from said surface, and means for operating said elements to simultaneously roll said piece of dough between them and move said slats alternately toward and from said surface for alternately applying and relieving pressure to and from said piece of dough and form the latter into a roll.

EDWARD T. PARSONS.